United States Patent [19]

Robbins et al.

[11] 3,794,996
[45] Feb. 26, 1974

[54] STABLE BASE-BAND SUPERREGENERATIVE SELECTIVE RECEIVER

[75] Inventors: Kenneth W. Robbins, Wilmington; Gerald F. Robbins, Lexington, both of Mass.

[73] Assignee: Sperry Rand Corporation, Great Neck, N.Y.

[22] Filed: July 12, 1972

[21] Appl. No.: 271,084

[52] U.S. Cl................. 343/7 A, 325/129, 325/325, 343/17.1 R
[51] Int. Cl............................................. G01s 9/06
[58] Field of Search ............ 343/7 A, 7 ED, 17.1 R; 325/325, 129

[56] References Cited
UNITED STATES PATENTS
3,662,316   5/1972   Robbins............................ 325/325
3,659,203   4/1972   Ross.................................. 325/129
3,686,669   8/1972   Toulis............................ 343/17.1 R Primary Examiner—Maynard R. Wilbur
Assistant Examiner—G. E. Montone
Attorney, Agent, or Firm—Howard P. Terry

[57] ABSTRACT

An energy-amplifying signal-selecting circuit for sampling base-band signals, such as directionally transmitted subnanosecond signals reflected from objects, is arranged to provide a substantial output signal for the operation of apparatus, for example, such as passenger protective or restraining apparatus in the event of a vehicular collision. The system includes a broad band transmission line antenna cooperating with biased semiconductor first and second detector elements, the first detector being located within the transmission line for detecting substantially the total energy of a received base-band echo signal. The second detector provides time selected or gated outputs indicating the presence of the gated echo pulse.

11 Claims, 5 Drawing Figures

STABLE BASE-BAND SUPERREGENERATIVE SELECTIVE RECEIVER

CROSS REFERENCE

This invention is an improvement over the invention disclosed and claimed in the G. F. Ross United States patent application serial number 137,355 now U.S. Pat. No. 3,750,025 for "Energy Amplifying Selector Gate for Base-Band Signals," filed Apr. 26, 1971 and assigned to the Sperry Rand Corporation.

BACKGROUND OF THE INVENTION

1. Field of the Invention

The invention pertains to means for the reception, selective gating, and wave form conversion of base-band or subnanosecond electromagnetic signals and more particularly pertains to means for stable reception and selective use of the presence of such base-band signals for the generation of alarm or control signals for safety purposes.

2. Description of the Prior Art

Generally, prior art signal selector or gating systems are associated with the gating of pulsed continuous wave signals that are often each of many radio frequency cycles duration. In such prior art systems, the pulsed signal to be selected is normally in the form of a pulsed high frequency carrier signal, so that complex signal reception, amplification, and frequency conversion circuits must be used to process the signal prior to the selection or range gating step. It has been the experience with such arrangements that, because they are complex and relatively inefficient, they are sensitive to many failure possibilities. Furthermore, conventional object detection receiver and signal gating systems are not capable of measuring ranges of close-by objects. Also, prior art selector or range gating circuits are not adaptable to the direct processing of short base-band nanosecond and subnanosecond signals.

One effective system for object detection by radiation and reception of base-band or subnanosecond electromagnetic pulses is the subject of the above-mentioned G. F. Ross patent application Ser. No. 137,355; a system is taught therein for receiving and selectively gating very short base-band electromagnetic pulses and for generating an energy amplified output useful for operating utilization equipment. The system of the Ross application employs a substantially dispersionless transmission line antenna arrangement cooperating with a biased semiconductor gating or selector device located directly within the antenna transmission line for detecting the total energy of in-coming base-band pulses. A cooperating circuit coupled to the gating device regenerates the in-coming signal and produces a corresponding output signal suitable for application in utilization devices incorporating generally conventional circuits of the type designed to process pulse signals of more normal duration.

While such base-band gated receiver systems perform satisfactorily in many applications, they are not always suited for reliable operation where a very wide range of adverse environmental conditions must be tolerated. In particular, in some severe environments such as in certain types of heavy motor vehicles, the prior art base-band receiver does not reliably maintain the desired response at the desired threshold level. Severe temperature extremes, ignition noise, and vibration are factors which undermine the reliability of such prior art devices in certain applications. Along with increasing system detection reliability so that false alarms are substantially eliminated, it is desired considerably to increase the sensitivity of the base-band gated receiver.

SUMMARY OF THE INVENTION

The present invention relates to an electromagnetic energy pulse system for transmitting very short base-band pulses and for their reception after reflection from objects to be detected. The base-band receiver processes the base-band signals, generating an energy amplified output useful for operating utilization equipment. The novel system employs dispersionless transmitter and receiver antenna and transmission line elements cooperating directly with a biased avalanche transistor detector placed directly within the receiver transmission line for detecting the total energy of each echo pulse. The detector is cyclically operated on a time sharing basis first in a free-running pulsing mode which generates and stores a gain control signal for providing high stability and sensitivity of the detector each time it operates in its second or avalanche detector mode. An amplified, time-extended pulse is generated by the avalanche first detector each time an echo is present during its detector mode. This detected signal is applied to a generally similar range gated avalanche second detector circuit which reliably yields a useful output signal whenever the echo falls within a particular range gate.

Since the total energy of each base-band echo pulse is instantaneously supplied by the receiver antenna to the avalanche first detector, that detector may operate successfully with short base-band pulses having spectral components the amplitudes of which are all incapable of detection by conventional narrow band receivers. The total energy in each base-band pulse can, however, be relatively larger than the level of noise or other interfering pulses or signals in the vicinity of the novel gated receiver-detector. Thus, by appropriately adjusting the sensitivity or threshold of the novel receiver-detector, base-band signals not affecting other receivers are readily received, detected, and gated without the detector being affected in substantial degree by other radio energy transmissions. The major processing of the echo signal is accomplished, according to the invention, by simple base-band signal circuits, thus avoiding the need for signal frequency conversion and the problems associated with alignment and operation of conventional radio and intermediate frequency amplifiers.

DESCRIPTION OF THE PREFERRED EMBODIMENT

Figure 1:
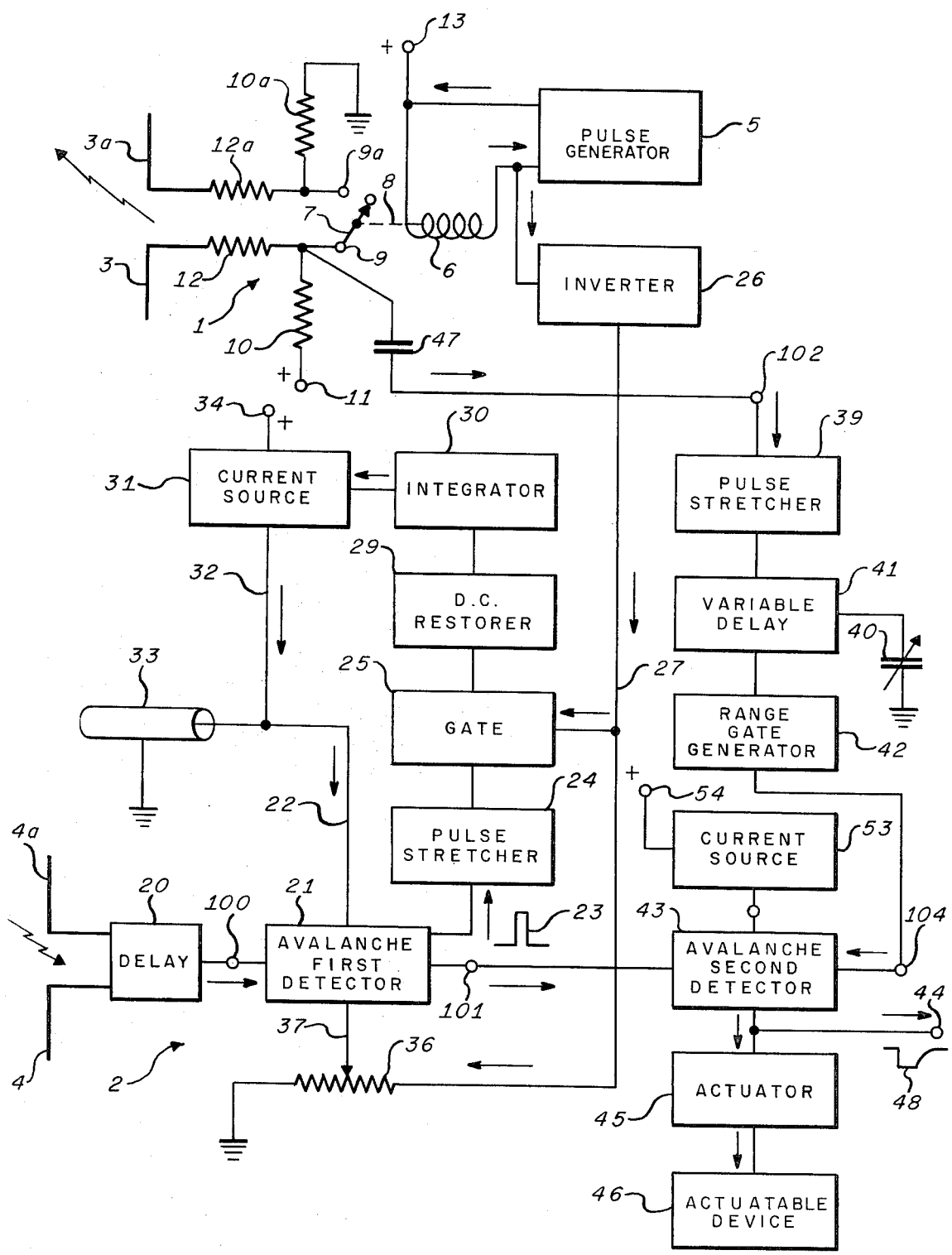
FIG. 1 is a block diagram of the invention showing electrical connections between its components.

The short pulse transmitter 1 employed in the invention is actuated by a conventional current pulse generator 5 which receives power via terminal 13 and which also serves to supply synchronizing signals for the control of the system receiver 2. Flow of regular current pulses through coil 6 operates switch 7 for the purpose of operating transmitter 1 because of the action of mechanical connection 8 in alternately connecting and disconnecting terminals 9 and 9a. Switch 7 may take over convenient forms, but is preferably a commercially available mercury-wetted, single pole, single throw, normally open reed switch providing, upon closure a current pulse therethrough having a 100 picosecond or less rise time. For example, suitable switches having a fraction of an ohm in resistance when closed, a 300 volt make-break capability, and up to a 200 cycle per second operating frequency with a one millisecond closure time are readily available on the market.

Switch 7 is thus used periodically to excite a simple radiator antenna, such as a dipole antenna having paired radiating conductors 3 and 3a. Charging resistors 10, 10a are of a relatively high value. Resistor 10 couples antenna conductor 3 to a potential source (not shown) coupled to terminal 11. Resistor 10a couples antenna conductor 3a to ground. The paths from terminals 9, 9a to the respective antenna conductors 3, 3a pass through similar matching resistors 12, 12a. Resistors 10, 10a may be 10 megohms each, while resistors 12, 12a may be 100 ohms. Closure of switch 7, occurring about one millisecond after driver coil 6 is energized, causes a fast rise base-band pulse to be propagated through the transmission line including resistors 12, 12a and the respective dipole elements 3, 3a and to be launched into space by the latter.

The transmitter 1 and its associated antenna 3, 3a may take any of several forms, such as that of the G. F. Ross, D. Lamensdorf U.S. Pat. application Ser. No. 46,079 for a "Balanced Radiator System," filed June 15, 1970, now patent 3,659,203 and assigned to the Sperry Rand Corporation. Suitable transmitter and antenna arrangements are also illustrated in the G. F. Ross U.S. Patent application Ser. No. 137,355 for an "Energy Amplifying Selector Gate for Base-Band Signals", filed Apr. 26, 1971 and in the G. F. Ross U.S. Patent application Ser. No. 145,154 for "A Base Band Short Range Pre-Collision Sensor for Actuating Vehicle Safety Apparatus," filed May 20, 1971, now U.S. Pat. No. 3,735,398 both applications being assigned to the Sperry Rand Corporation. The antenna may take the form shown in FIG. 1 with the leads supporting dipole elements 3, 3a and projecting through clearance holes in the apex 16 of a reflector made up of similar flat conductors 15, 15a. The dipole 3, 3a lies in a plane bisecting the vee-shaped cross section of reflector 15, 15a. The dipole antenna 3, 3a inherently has a major degree of directivity in the horizontal or bisecting plane, and the vee-shaped reflector 15, 15a desirably adds directivity in the vertical plane or the plane perpendicular to the bisector plane. Other antenna feeds or reflectors may alternatively be employed.

Figure 2:
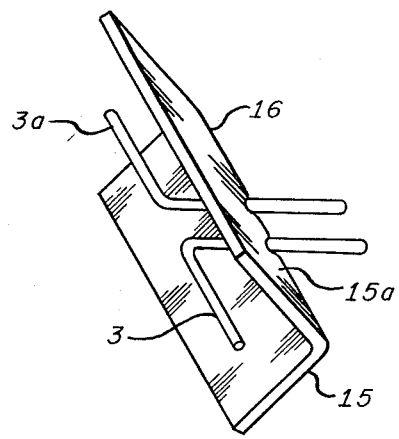
FIG. 2 is a perspective view of one of the antennas employed in FIG. 1.

Receiver antenna 4, 4a is oriented so as to view objects illuminated by energy directed toward them by transmitter antenna 3, 3a. The receiver antenna 4, 4a may also have a reflector structure generally similar to that of FIG. 2, but is coupled for collection of object reflected base-band signals. In a representative application for measuring the distance between the front of a first vehicle and the rear of a second, the centers of the antenna 3, 3a and 4, 4a may be spaced apart by about 50 centimeters with their dipole conductors horizontal. The dipole tips for each dipole pair may be about 10 centimeters apart.

The receiver 2 connected to receiver antenna 4, 4a operates synchronously with transmitter 1 and regularly alternating modes. In a first of the alternating modes, a principal receiver element operates as a variable frequency free-running pulse generator in a feed back loop for controlling over-all receiver sensitivity. In a second mode, cyclically alternating with the first mode, free-running pulse generation is inhibited and the principal receiver element operates only in the presence of a range gate, the threshold sensitivity being a function of the level of the fed back current generated during the first mode.

Receiver antenna 4, 4a is connected to receiver 2 through a trimming delay circuit 20 which serves the usual role of adjusting relative delays of parallel channels within a pulse system. The output of delay circuit 20 is coupled as an input to the base of the first detector 21 which is an avalanche transistor detector of the type previously described in the above-mentioned Patent application Ser. No. 137,355 and whose collector electrode is supplied with a substantially constant or controlled current via lead 22. The output 23 of the avalanche first detector 21 is taken from its emitter electrode and is applied to a conventional pulse stretcher 24 which may be a conventional single-shot multivibrator. This pulse output 23 is supplied as one input to the gating circuit 25 and may be about two microseconds long.

Figure 3:
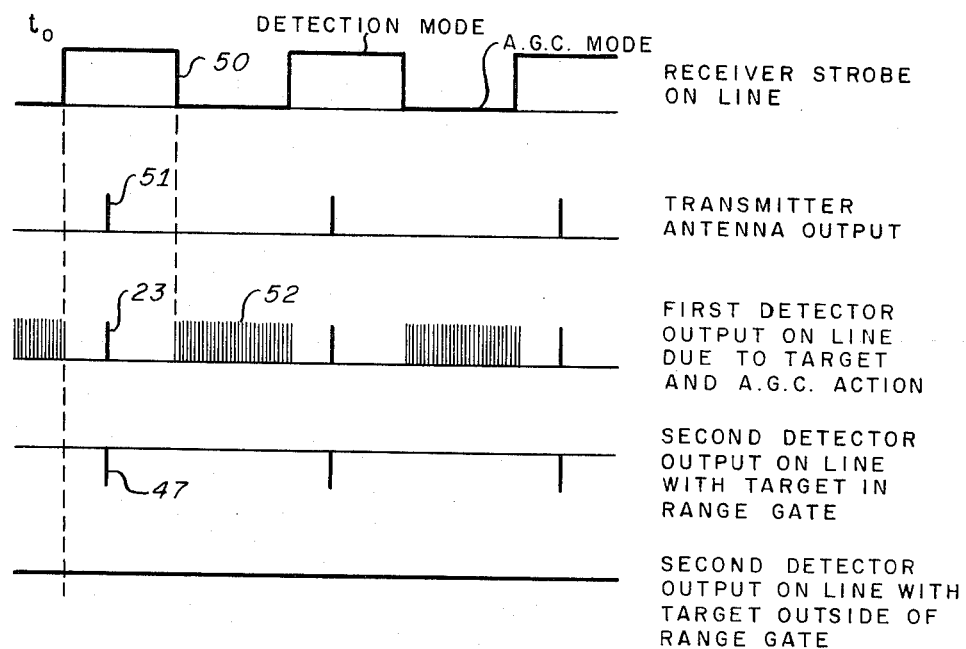
FIG. 3 is a wave form graph useful in explaining the operation of the invention.

A second or mode gating input for gate circuit 25 is a synchronizing signal 50 (FIG. 3) supplied by the transmitter current pulse generator 5 through inverter 26 and lead 27 to mode gate 25. The gated output of mode gate 25 is coupled to a conventional direct current restorer diode circuit 29 and through a conventional resistance-capacitor integrator circuit 30 to the regulated current source 31. Source 31 receives power from a conventional supply (not shown) coupled to terminal 34. The output of source 31 is supplied via leads 32 and 22 to control the operation of the transistor within avalanche first detector 21. A branch line at the junction of leads 22 and 32 includes a shorted transmission line 33 approximately 30 centimeters long. The delay transmission line 33 determines the length of each output pulse generated by the first detector 21. It is seen from FIG. 3 that the output of first detector 21 in the first mode of the system is a series of trains 52 of narrow pulses, the avalanche first detector 21 and its associated loop operating as a free-running pulse generator. Manual adjustment of the contact 37 of potentiometer 36 determines the sensitivity of first detector 21, potentiometer 36 being coupled between ground and the lead 27 being connected through inverter 26 to the current pulse generator 5.

As noted previously, receiver 2 operates cyclically in a first mode to generate its own automatic gain control voltage. Such operation employs the circuit elements thus far described. Additional circuit elements used in the second mode on a time-shared basis for detecting and processing an echo signal will now be discussed. A synchronizing signal for use in detecting and processing such an echo signal is derived from terminal 9 of switch 7 and is coupled by capacitor 47 to a conventional pulse stretcher circuit 39; circuit 39 lengthens the baseband pulse coupled by capacitor 47 to a length generally suitable for application to a conventional variable delay circuit 41. The amount of delay of the pulse is determined by manually or electronically varying a parameter of an element of a conventional delay circuit 41, such as adjustable capacitor 40, which, it is understood, may be an automatically or remotely adjustable varactor in certain applications. The amount of delay inserted by variable delay circuit 41 determines the time at which the conventional gate generator 42 produces an output range gating pulse. However, since transmitter 1 is always fired in the detection mode era 50 (FIG. 3), the range gate is always produced during the detection mode era, and never in the era when the automatic gain control voltage is generated (wave era 52).

The range gate produced by gate generator 42 is passed as a gating or enabling input to the avalanche second detector 43, to a second input of which is coupled the echo pulse 23 produced by the avalanche first detector 21. Detector 43 is fed a constant current from current source 53 derived from a supply (not shown) attached to terminal 54. When there is coincidence between the range gate and the echo wave 23, an output wave 48 is generated by the avalanche second detector 43 and will appear at the output terminal 44 thereof. The output 48 may be applied to a conventional actuator 45 to operate a conventional actuatable device 46, such as an air bag or other safety or passenger restraining device of the kind discussed in the above mentioned Ross patent application Ser. No. 145,154. The variable delay 41, range gate generator 42, and avalanche gated detector 43 may be generally similar to corresponding elements shown, for example, in the above mentioned patent applications Ser. No. 137,355 and Ser. No. 145,154.

In operation, it is seen that the avalanche first detector transistor 21 is allowed to operate as a free-running pulse generator during alternately successive time intervals to form the pulse trains of wave 52. The output pulse train 52, after stretching by circuit 24, is subjected to direct current restoration by circuit 29 and is integrated (30). The unidirectional voltage thus generated is fed back through regulator 31 to control the current flowing through the avalanche first detector 21. This operation determines the sensitivity of the avalanche first detector 21. The larger the current through detector 21, the higher its pulse repetition frequency and the higher the unidirectional current controlling current regulator 31. The increasing bias voltage fed to current source 31 is fed in such a way as to decrease current through the avalanche first detector 21 and therefore to decrease its sensitivity.

When the drive signal 50 is applied to operate switch 7, a version of the same pulse is fed via inverter 26 and lead 27 to mode gate 25 to inhibit the free-running pulse generation mode of the circuit. However, the operating current fed by current source 31 to the avalanche first detector 21 remains substantially constant, since the time constant of d.c. restorer 29 and the integrator 30 is relatively large (for example, greater than 100 milliseconds). Thus, if the duty cycle of the receiver 2 is 50 per cent, the receiver is in effect a wide-open detector 50 per cent of the time. Whenever an echo pulse exceeding the arbitrary threshold amplitude is collected by antenna 4, 4a, the avalanche first detector 21 conducts, yielding a pulse 23 at its output. The absolute sensitivity level is set by the bias potentiometer 36 supplied with wave 50.

The output of the avalanche first detector 21 is a pulse 23 which is fed to the base of the avalanche transistor of the non-oscillating avalanche second detector circuit 43. The emitter of second detector 43 is normally held off by a small bias (+3 volts, for example). The range gate from generator 42 is coupled to the emitter electrode of avalanche second detector 43. As noted above, if there is coincidence between pulse 23 and the range gate, then the second detector 43 is activated and the useful output pulse 47 is formed.

Figure 4:
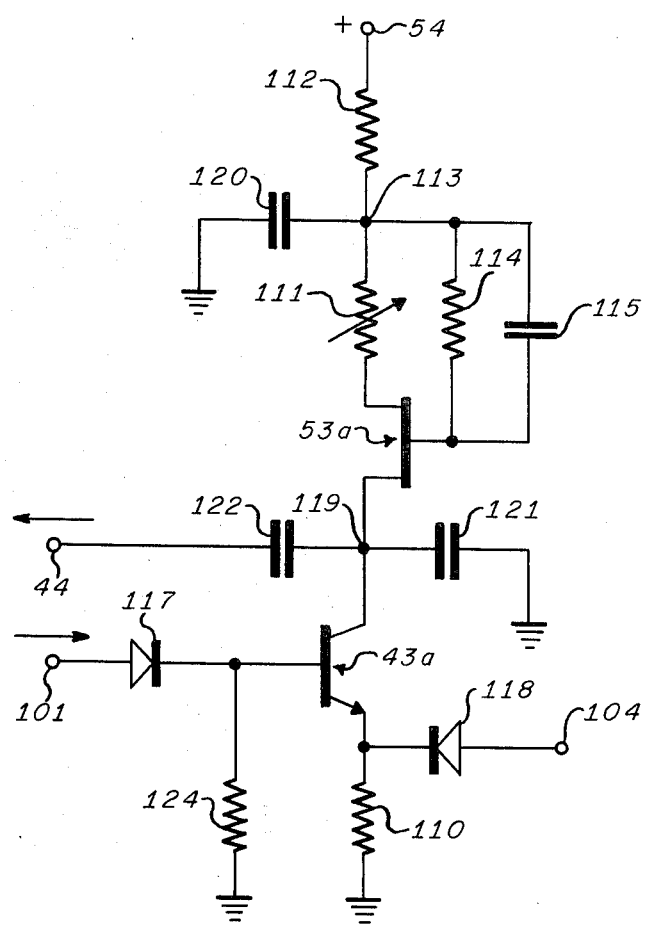
FIG. 4 is a detailed circuit diagram of a portion of FIG. 1.

FIG. 4 illustrates in greater detail one form of the avalanche second detector 43 and its associated current source 53, though the arrangement may take other forms, including configurations similar to that of the gated detector disclosed in the aforementioned patent application Ser. No. 137,355. In the FIG. 4 arrangement, the avalanche transistor 43a, which may be of the 2N5130 type, of the avalanche second detector circuit 43 is placed in a series circuit between ground and the terminal 54, which terminal 54 may be operated at plus 67 volts. The series circuit includes resistor 110, avalanche transistor 43a, field effect transistor 53a, adjustable resistor 111, and fixed resistor 112. The junction 113 between resistors 111 and 112 is coupled by resistor 114 and the shunt capacitor 115 to the gate electrode of field effect transistor 53a, which may be of the MPF 161 type. The output of avalanche first detector 21 appearing on terminal 101 is coupled through diode 117 to the base of the avalanche second detector transistor 43a. The range gating pulse from generator 42 appearing on terminal 104 is coupled through diode 118 to the emitter of transistor 43a. Diodes 117, 118 prevent access of improperly polarized signals to the avalanche second detector 43a and may be of the MBD 101 type. The useful output of the stage appears at terminal 44 and is capacity coupled from the junction 119 between transistors 43a and 53a.

In the quiescent state of the circuit of FIG. 4, it will be seen that avalanche detector transistor 43a is non-conducting. The field effect transistor 53a acts as a conventional constant current source, assuring that a constant current is fed to avalanche detector transistor 43a so that its bias state is precisely controlled. In the event of the arrival of a gating signal on terminal 104, the avalanche second detector transistor 43a is placed in its fully sensitive state. The coincident arrival of an echo pulse on terminal 101 causes avalanche conduction of transistor 43a, and an amplified and time extended output pulse is generated at terminal 44 for supply to utilization equipment.

Figure 5:
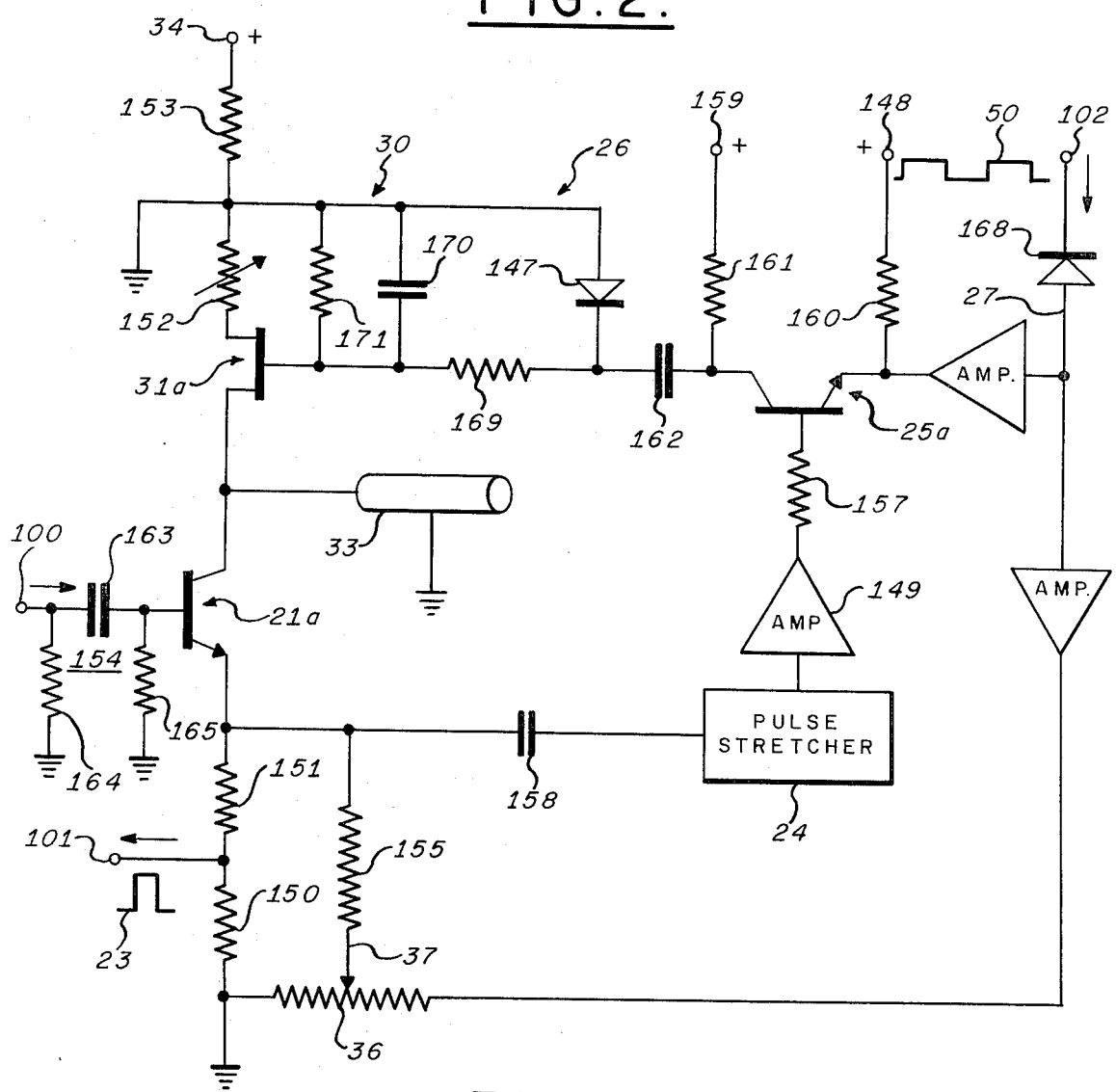
FIG. 5 is a detailed circuit diagram of an additional portion of FIG. 1.

A portion of the circuit associated with the avalanche first detector 21 operates in a manner somewhat similar to the operation of avalanche second detector 43 when in the signal detection mode. Referring to FIG. 5, the avalanche first detector 21a, which may be of the 2N5130 kind, is placed in a series circuit between ground and terminal 34, which terminal 34 may be operated at plus 67 volts. The series circuit includes resistors 150 and 151, the avalanche transistor 21a, field effect current regulator transistor 31a, which may be of the MPF161 type, adjustable resistor 152, and fixed resistor 153. Field effect transistor 31a has its source electrode coupled to resistor 152 and its drain electrode coupled to the collector of transistor 21a. Input echo signals are coupled by network 154 to the base of avalanche transistor 21a, while the output for supply via terminal 101 is taken between resistors 150, 151.

Cyclic control of transistor 21a between its free-running pulse generator mode and its detector mode is exercised, as previously explained, by applying mode gating wave 50 from lead 27, after amplification, if necessary, across potentiometer 36 and thence via tap 37 through resistor 155 to the emitter of avalanche first detector transistor 21a. This signal when positive acts as a hole-off bias that stops the random firing of avalanche first detector 21a and only an echo signal of amplitude greater than the set-in bias will fire detector 21a.

The emitter of transistor 21a is coupled via capacitor 158 so that in the gain control or free-running mode of the circuit, the pulses are extended by pulse stretcher 24 from 2 nanoseconds to 2 microseconds duration, for example. The output of pulse stretcher 24 may be increased in amplitude by amplifier 149. The output of amplifier 149 is coupled by resistor 157 to the base of the gating transistor 25a, whose emitter is supplied with mode gating wave 50 and is also coupled to a voltage source (not shown) coupled to terminal 148 through resistor 160. The collector of transistor 25a, which may be of the 2N5130 type, supplies a useful output and is coupled through resistor 161 to terminal 159. Terminals 148 and 159 may be supplied from 5 and 12 volt supplies, respectively.

The output of range gate transistor 25a is coupled by capacitor 162 to a conventional direct current restoration circuit utilizing diode 147 and then to integrator network 30. The integrated gain control voltage, as previously explained, is added across the resistor 152 to the voltage supplied by the source coupled to terminal 34 for control of the current flowing through field effect transistor 31a, therefore controlling the threshold of avalanche first detector transistor 21a. As noted previously, the circuit acts as a detector of echo signals supplied at terminal 100 when mode wave 50 is positive and as a free running pulse generator in the alternate cycles when mode wave 50 drops to zero.

It is seen that the invention makes use of the advantageous properties of base-band signal transmission and reception of signals by employing a transmission line system or other medium having non-dispersive characteristics. Preferably, the antenna and transmission line elements operate in the TEM mode, propagation modes that permit dispersion of the base-band pulses not being used. In this manner, the full energy of the received base-band pulses originally generated by transmitter 1 are efficiently directed for processing within the amplifying avalanche first detector 21 and for selective gating within the avalanche second detector 43. In this concept, the first detector operates as a superregenerative receiver. The gain A of the loop and the feed-back attenuation factor $\beta$ is determined by the transconductance of the current source 31 and the circuit constants of components 24, 25, 29, and 30 respectively. In addition, the transconductance of the avalanche transistor 21 contributes to the gain of this loop. Variations in the transconductance or the cirucit constants due to temperature and humidity changes are reduced by the return difference of the loop; that is, by a factor of $1 + A\beta$. For a representative circuit $1 + A\beta$ is approximately 30. Thus, the sensitivity of the circuit detector remains reasonably invariant over the temperature range of $-20°$ to $200°F$.

It is seen that the invention provides means having gain for the precise sampling of short-duration electromagnetic waves wherein the sampling time and sampling duration depend upon reliable stable elements and that the system employs stable balanced, non-dispersive transmission line elements for preventing distortion of the signals to be sampled. The invention is capable of operation at very fast echo sampling rates, permitting the sampling and processing of echo signals of duration of the order of one nanosecond or less.

It is seen that the system overcomes the difficulties of the prior art in that reliable operation without false responses is insured. The probability of an externally generated electrical noise spike being actually coincident in time with the range gate is remote. Furthermore, such noise signals as generated by automotive ignition systems, lightning, or surges in power lines all occur at rates significantly less than the free-running rate of the avalanche first detector 21. For example, the avalanche first detector 21 may have a free-running rate between 0.5 and 1 megacycles per second, while ignition noises, for example, occur at rates of the order of 400 cycles per second. It is thus seen that the unidirectional voltage level which determines the threshold sensitivity of the avalanche first detector 21 is substantially invariant. It should further be noted that the 50 per cent duty cycle mentioned in the foregoing discussion of the invention may be considerably altered and is mentioned by way of example only. The interference defects above discussed may be additionally reduced by increasing the free-running time of the circuit associated with the avalanche first detector 21 from 50 to 90 per cent.

Accordingly, it is seen that the base-band object detection and ranging system of the present invention provides enhanced sensitivity with stability maintained over a wide temperature range because of the feed back gain control operation employed. This same feature additionally enhances the stability of the system when it is disturbed by other environmental conditions such as high humidity. It is seen that the avalanche first detector is a sensitive device permitting operation of transmitter 1 and receiver 2 at millisecond switching rates. The second or gated avalanche second detector 43 may be considerably less sensitive than the first avalanche detector 21 and therefore it may be adjusted to have considerable inherent stability. Essentially, detector 43 is an AND circuit where the two inputs are the range gate and the reconstituted video from the first detector 21. Accordingly, processing of an incoming echo signal is accomplished in two steps so that sensitivity, threshold stability, and range resolution are contained without compromise.

While the invention has been described in its preferred embodiment, it is to be understood that the words which have been used are words of description rather than of limitation and that changes within the purview of the appended claims may be made without departing from the true scope and spirit of the invention in its broader aspects.

We claim:

1. Base-band signal selector means comprising:

wide band transmission line means for propagating electromagnetic pulse signals in the TEM transmission mode substantially without distortion thereof, avalanche transistor means having base, collector, and emitter electrode means, input circuit means responsive to said transmission line means for coupling said pulse signals to said base electrode means substantially without distortion thereof, output circuit means coupled to said emitter electrode means, cyclically controlled feed back bias generator means coupled between said emitter electrode and collector electrode means, mode gating means within said feed back bias generator means for cyclically controlling said feed back bias generator means in first and second operating modes, said feed back bias generator, when in said first mode, causing said avalanche transistor means to operate as a free-running pulse generator, and said feed back bias generator, when in said second mode, causing said avalanche transistor means to supply detected versions of said pulse signals at said output circuit means.

2. Apparatus as described in claim 1 wherein said cyclically controlled feed back bias generator means comprises in series relation:

pulse stretcher means responsive to said emitter electrode means,
mode controlling gate means,
direct current restorer means,
integrator means, and
current control means coupled to said collector electrode means.

3. Apparatus as described in claim 2 further including second transmission line means coupled in branching relation between said series connected current control means and said collector electrode means.

4. Apparatus as described in claim 3 wherein said current control means comprises:

field effect transistor means having drain, source, and gate electrode means,
said gate electrode means being responsive to said integrator means,
said drain electrode means being adapted for connection to current supply means, and
said source electrode means being coupled to said collector electrode means.

5. Apparatus as described in claim 4 further including:

mode synchronizer means for generating a cyclic output wave having first and second levels,
means for supplying a first version of said mode synchronizer means cyclic output wave to said mode controlling gate means, and
means for supplying a second version of said mode synchronizer means cyclic output wave to said emitter electrode means.

6. Apparatus as described in claim 5 further including transmitter means responsive to said mode synchronizer means for generating transmitter output pulses for coupling to said wide band transmission line means when said feed back bias generator means is in said second mode.

7. Apparatus as described in claim 6 wherein:

said wide band transmission line means comprises dual conductor transmission line means, and
said dual conductor transmission line means is coupled to dipole antenna means.

8. Apparatus as described in claim 1 further comprising:

gated detector means responsive to said output circuit means of said avalanche transistor means for supplying to utilization means a time extended output pulse, and
range gate generator means responsive to said mode synchronizer means for gating said gated detector means.

9. Apparatus as described in claim 8 wherein said utilization means comprises:

actuator means, and
means actuatable by said actuator means.

10. Apparatus as described in claim 8 wherein said gated detector means comprises:

gated transistor means having base, collector, and emitter electrode means,
said gated transistor means base means being coupled to said output circuit means of said avalanche transistor means,
said gated transistor collector means being coupled to constant current supply means, and
said gated transistor emitter means being responsive to said range gate generator means.

11. Apparatus as described in claim 10 wherein said range gate generator means comprises in series relation:

pulse stretcher means responsive to said mode synchronizer means,
variable delay means, and
range gate generator means.

* * * * *